(12) United States Patent
Kim et al.

(10) Patent No.: US 8,780,309 B2
(45) Date of Patent: Jul. 15, 2014

(54) MOTHER PANEL OF LIQUID CRYSTAL DISPLAY AND METHOD OF MANUFACTURING LIQUID CRYSTAL DISPLAY USING THE SAME

(75) Inventors: Dong-Wook Kim, Yongin (KR); Seung-Kyu Lee, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 737 days.

(21) Appl. No.: 12/926,635

(22) Filed: Dec. 1, 2010

(65) Prior Publication Data

US 2011/0310342 A1 Dec. 22, 2011

(30) Foreign Application Priority Data

Jun. 16, 2010 (KR) .......................... 10-2010-0057171

(51) Int. Cl.
*G02F 1/1345* (2006.01)

(52) U.S. Cl.
USPC .......................................................... 349/149

(58) Field of Classification Search
USPC ............ 349/1, 19, 56, 58, 149, 167, 182, 187, 349/193, 202
See application file for complete search history.

(56) References Cited

U.S. PATENT DOCUMENTS

2009/0296011 A1* 12/2009 Yoon et al. ...................... 349/40

FOREIGN PATENT DOCUMENTS

| JP | 09-044102 A | 2/1997 |
| JP | 2003-177408 A | 6/2003 |
| KR | 10 2004-0062051 A | 7/2004 |
| KR | 10-0855810 B1 | 9/2008 |

\* cited by examiner

*Primary Examiner* — Mark Robinson
*Assistant Examiner* — Mary El Shammaa
(74) *Attorney, Agent, or Firm* — Lee & Morse, P.C.

(57) ABSTRACT

A mother panel of a liquid crystal display (LCD) having a lower substrate with a pixel electrode, an upper substrate with a common electrode, and a liquid crystal layer between the lower and upper substrates includes an external pad area including a common voltage external pad and a pixel voltage external pad on the lower substrate, the common voltage external pad and pixel voltage external pad being configured to be applied with respective common and pixel voltages from the outside, a panel area including a plurality of panels and a dummy area between the panels, and an external shorting point in the dummy area of the panel area, the external shorting point being connected to the common electrode, and the common voltage external pad being directly connected to the external shorting point.

19 Claims, 6 Drawing Sheets

MOTHER PANEL OF LIQUID CRYSTAL DISPLAY AND METHOD OF MANUFACTURING LIQUID CRYSTAL DISPLAY USING THE SAME

BACKGROUND

1. Field

The described technology relates generally to a mother panel of a liquid crystal display (LCD), and a method of manufacturing a LCD using the same.

2. Description of the Related Art

A LCD display device may include two substrates with electrodes and a liquid crystal layer inserted therebetween. The LCD display device adjusts an amount of transmitted light by rearranging liquid crystal molecules of the liquid crystal layer via voltage application to the electrodes.

A LCD is completed by separating a mother panel, in which an upper substrate and a lower substrate are attached to each other, into a plurality of panels through a scribing process or a laser trimming process. A driving circuit chip may be directly mounted on each panel with a chip-on-glass (COG) method.

In small and medium sized LCDs, in order to embody a high aperture ratio and perform high speed response, a pretilt may be provided to the liquid crystal molecules of the liquid crystal layer. For example, a photo-curable process may be performed after applying an electric field to each panel in a mother panel state, i.e., to provide the pretilt.

The above information disclosed in this Background section is only for enhancement of understanding of the background of the described technology and therefore it may contain information that does not form the prior art that is already known in this country to a person of ordinary skill in the art.

SUMMARY

Embodiments are directed to a mother panel of a LCD and a method of manufacturing a LCD using the same, which substantially overcome one or more of the problems due to the limitations and disadvantages of the related art.

It is a feature of an embodiment to provide a mother panel of a LCD with a reduced number of voltage wires between panels in the mother panel, thereby increasing efficiency of the mother panel.

It is another feature of an embodiment to provide a method of manufacturing a LCD with a reduced number of voltage wires between adjacent panels in a mother panel, thereby increasing space efficiency in the mother panel.

At least one of the above and other features and advantages may be realized by providing a mother panel of a LCD having a lower substrate with a pixel electrode, an upper substrate with a common electrode, and a liquid crystal layer between the lower and upper substrates, the mother panel including an external pad area including a common voltage external pad and a pixel voltage external pad on the lower substrate, the common voltage external pad and pixel voltage external pad being configured to be applied with respective common and pixel voltages from the outside, a panel area including a plurality of panels and a dummy area between the panels, and an external shorting point in the dummy area of the panel area, the external shorting point being connected to the common electrode, and the common voltage external pad being directly connected to the external shorting point.

The pixel voltage external pad may be connected to a pixel voltage internal pad in each panel in the panel area through a pixel voltage wire, the pixel voltage wire being positioned in the dummy area of the panel area.

The mother panel may further include a test thin film transistor in an internal pad area of each panel, and a test voltage internal pad connected to a control terminal of the test thin film transistor, an input terminal of the test thin film transistor being connected to a respective pixel voltage internal pad.

The mother panel may further include a test voltage external pad in the external pad area, and a gate-on voltage wire in the dummy area, the gate-on voltage wire connecting the test voltage external pad and the test voltage internal pad.

The mother panel may further include an internal shorting point in each panel, the internal shorting point being connected to the common electrode, and a common voltage internal pad connected to the internal shorting point, the common voltage internal pad being directly connected to the test voltage internal pad through a test connection line.

The mother panel may further include a shorting bar in the dummy area of the panel area, the shorting bar being configured to prevent electrostatic discharge, and the pixel voltage external pad being connected to a pixel voltage internal pad of each panel through the shorting bar.

The mother panel may further include a test thin film transistor in an internal pad area of each panel, and a test voltage internal pad connected to a control terminal of the test thin film transistor, an input terminal of the test thin film transistor being connected to the pixel voltage internal pad.

The mother panel may further include a test voltage external pad in the external pad area, and a gate-on voltage wire in the dummy area, the gate-on voltage wire connecting the test voltage external pad and the test voltage internal pad.

The mother panel may further include an internal shorting point in each panel, the internal shorting point being connected to the common electrode, and a common voltage internal pad connected to the internal shorting point, the common voltage internal pad being directly connected to the test voltage internal pad through a test connection line.

The external shorting point may be directly connected between the common electrode and the common voltage external pad.

The mother panel may further comprising an internal shorting point in each panel, the internal shorting point being connected between the common electrode and a common voltage internal pad in the panel, and the common voltage internal pad being directly connected to a test voltage internal pad in the panel.

The external shorting point may be in a portion of the dummy area between the external pad area and a respective panel.

The mother panel may further include voltage wires in the dummy area of the panel area, the voltage wires connecting voltage external pads in the external pad area to corresponding voltage internal pads in the panel area, a total number of the voltage wires in the dummy area between adjacent panels being lower than a total number of the voltage external pads.

At least one of the above and other features and advantages may be realized by providing a method of manufacturing a liquid crystal display (LCD) having a lower substrate with a pixel electrode, an upper substrate with a common electrode, and a liquid crystal layer between the lower and upper substrates, the method including forming an external pad area including a common voltage external pad and a pixel voltage external pad on the lower substrate, the common voltage external pad and pixel voltage external pad being applied with respective common and pixel voltages from the outside, forming a panel area including a plurality of panels and a dummy area between the panels, and forming an external shorting point in the dummy area of the panel area, the external shorting point being connected to the common electrode, and the common voltage external pad being directly connected to the external shorting point.

The method may further include aligning liquid crystal molecules of the liquid crystal layer, the alignment including applying the common voltage from the common voltage external pad to the external shorting point, applying the pixel voltage from the pixel voltage external pad to a test voltage internal pad in each panel, and applying a liquid crystal alignment gate-on voltage from a test voltage external pad in the external pad area to the test voltage internal pad in each panel, and providing a pretilt to the liquid crystal molecules by performing a photo-curable process in the mother panel. The method may further include separating the mother panel into a plurality of panels by performing a scribing process, and performing a visual inspection using the test voltage internal pad of the panels.

The method may further include aligning liquid crystal molecules of the liquid crystal layer, the alignment including applying the common voltage from the common voltage external pad to the external shorting point, applying the pixel voltage from the pixel voltage external pad to a test voltage internal pad in each panel, and applying a liquid crystal alignment gate-on voltage to test thin film transistors of panels using a common voltage internal pad in each panel, the common voltage internal pad being directly connected to the test voltage internal pad in the panel, and providing a pretilt to the liquid crystal molecules by performing a photo-curable process in the mother panel. The method may further include separating the mother panel into a plurality of panels by performing a scribing process, and performing a visual inspection using the test voltage internal pad of the panels. Performing the scribing process may include cutting a test connection line that directly connects the test voltage internal pad and the common voltage internal pad.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2010-0057171, filed on Jun. 16, 2010, in the Korean Intellectual Property Office, and entitled: "Mother Panel of Liquid Crystal Display and Method of Manufacturing Liquid Crystal Display Using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
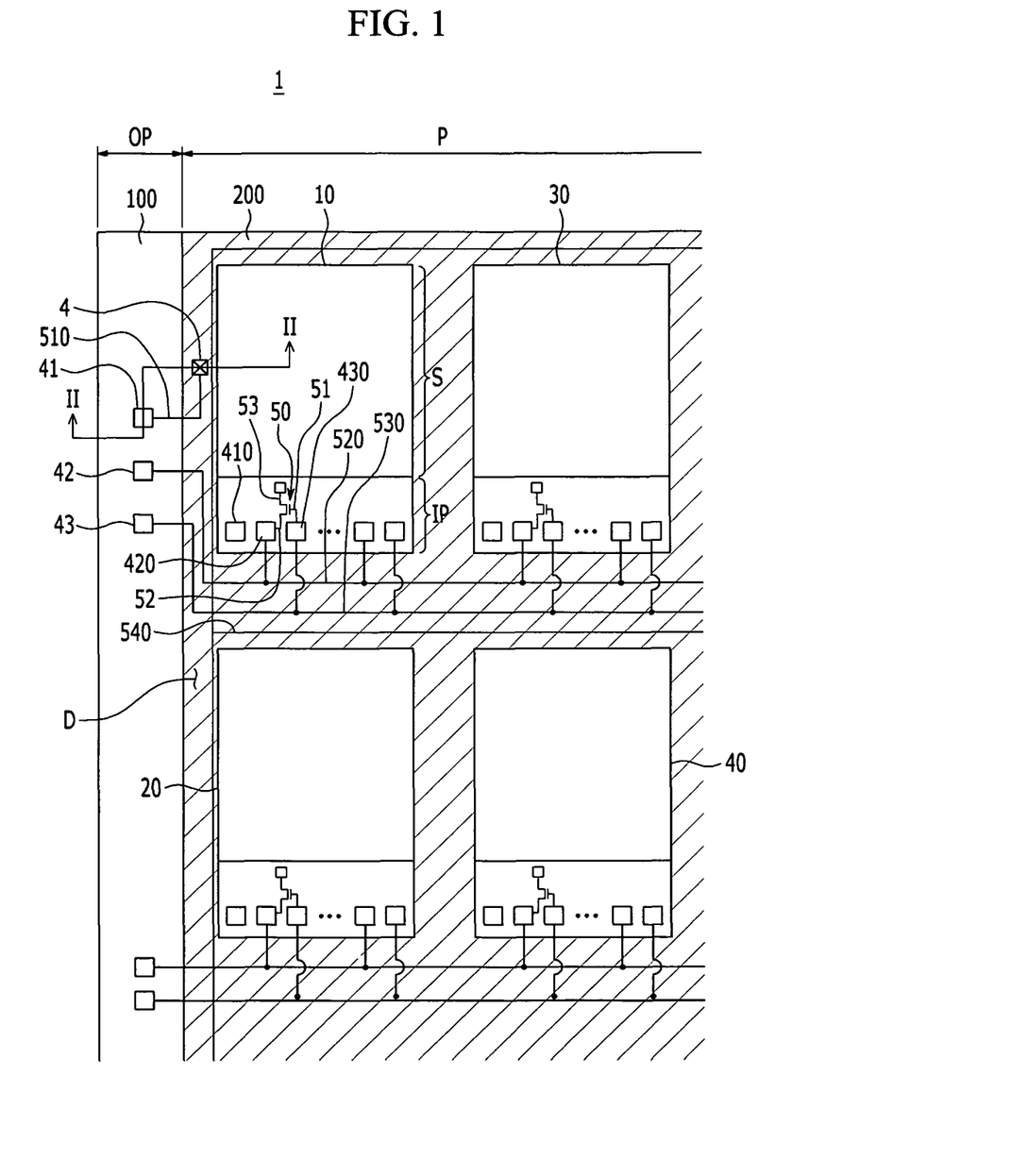
FIG. 1 illustrates a layout view of a mother panel of a LCD according to a first exemplary embodiment.

A mother panel of a LCD according to a first exemplary embodiment will be described in detail hereinafter with reference to FIGS. 1 and 2. FIG. 1 illustrates a layout view of a mother panel of a LCD according to a first exemplary embodiment, and FIG. 2 illustrates a cross-sectional view taken along line II-II of FIG. 1.

Figure 2:
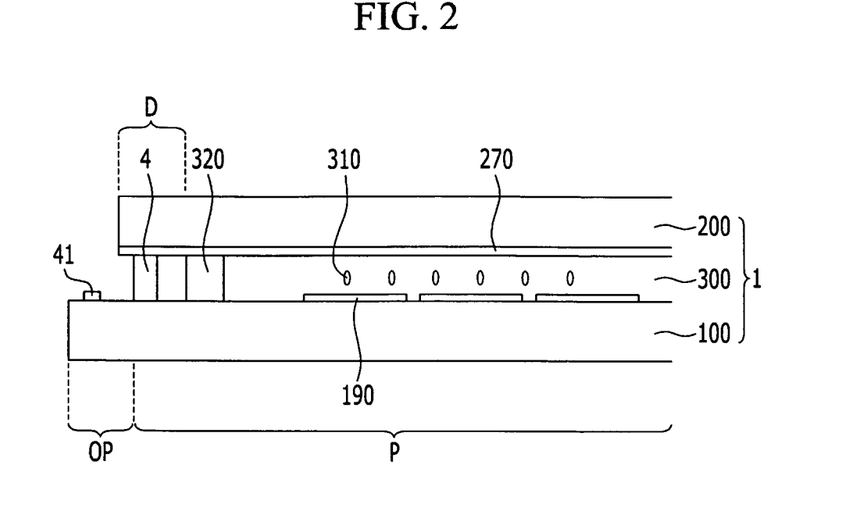
FIG. 2 illustrates a cross-sectional view taken along line II-II in the mother panel of the LCD of FIG. 1.

As shown in FIGS. 1 and 2, a mother panel 1 of a LCD may include a lower substrate 100 on which a pixel electrode 190 is formed, an upper substrate 200 that is opposite the lower substrate 100 and on which a common electrode 270 is formed, and a liquid crystal layer 300 that is formed between the lower substrate 100 and the upper substrate 200. The lower and upper substrates 100 and 200 may be connected to each other via a sealing material 320, so liquid crystal molecules 310 of the liquid crystal layer 300 may be sealed therebetween.

As further illustrated in FIGS. 1 and 2, the mother panel 1 may include a panel area P in which the upper substrate 200 is not removed, e.g., a region where the lower and upper substrates 100 and 200 overlap each other. The panel area P may include a plurality of individual panels to be separated from the mother panel 1 in a scribing process later, e.g., first through fourth panels 10, 20, 30, and 40. The mother panel 1 may further include an external pad area OP, e.g., a peripheral region to the panel area P, in which at least some of the upper substrate 200 is removed to expose a portion, e.g., a peripheral portion, of the lower substrate 100.

For example, as illustrated in FIG. 1, the first through fourth panels 10, 20, 30, and 40 may be disposed in the panel area P, and a dummy area D may be formed among the first through fourth panels 10, 20, 30, and 40. For example, the dummy area D may surround each of the first through fourth panels 10, 20, 30 and 40, so the dummy area D may separate between every two of the first through fourth panels 10, 20, 30 and 40 panels, and may be disposed in a peripheral portion of the panels 10, 20, 30, and 40. A pixel voltage wire 520, a gate-on voltage wire 530, and a shorting bar 540, may be formed in the dummy area D between rows of the panels 10, 20, 30, and 40. It is noted that even though the first exemplary embodiment illustrates a mother panel 1 with four panels 10, 20, 30 and 40, the mother panel 1 is not limited thereto and may be formed with any suitable number of panels.

A plurality of external pads 41, 42, and 43 may be formed in the external pad area OP. For example, a common voltage external pad 41, a pixel voltage external pad 42, and a test voltage external pad 43 may be sequentially formed with a predetermined gap between every two of the external pads.

The common voltage external pad 41 is a pad for transferring a common voltage to the panels 10, 20, 30, and 40 by applying a common voltage from the outside. The pixel voltage external pad 42 is a pad for transferring a pixel voltage to the panels 10, 20, 30, and 40 by applying a pixel voltage from the outside. A pretilt is provided to the liquid crystal molecules 310 of the liquid crystal layer 300 of the mother panel 1 by application of common voltage through the common voltage external pad 41 and pixel voltage through the pixel voltage external pad 42. The test voltage external pad 43 is a pad for applying a liquid crystal alignment gate-on voltage from the outside to a test thin film transistor 50, e.g., in each, of the panels 10, 20, 30, and 40. When turning on the test thin film transistor 50 by applying the liquid crystal alignment gate-on voltage, a pixel voltage that is applied through an input terminal 52 of the test thin film transistor 50 is transferred to the pixel electrodes 190 of the panels 10, 20, 30, and 40.

Each of the panels 10, 20, 30, and 40 includes an image area S, i.e., a region in which an image is displayed, and an internal pad area IP, i.e., a region in which a plurality of internal pads for applying a signal to the image area S are formed. A plurality of devices, e.g., a gate line, a data line, a switching thin film transistor, a pixel electrode 190, a common electrode 270, etc., may be formed in the image area S to display an image. A plurality of devices, e.g., a pixel voltage internal pad 420 to which the pixel voltage is applied, a test voltage internal pad 430 to which the test gate-on voltage is applied, etc., may be formed in the internal pad area IP. The internal pads formed in the internal pad area IP are not limited to the above, and pads for applying various signals may be formed in the internal pad area IP.

As further illustrated in FIGS. 1 and 2, an external shorting point 4 may be formed in the dummy area D of the panel area P. The external shorting point 4 may be adjacent to the external pad area OP. For example, as illustrated in FIG. 2, the external shorting point 4 may extend between the lower and upper substrates 100 and 200, and may contact, e.g., directly contact, the common electrode 270 of the upper substrate 200. As illustrated in FIG. 1, the external shorting point 4 may be connected to the common voltage external pad 41 through a shorting connection line 510 of the lower substrate 100. Therefore, the common voltage that is applied to the common voltage external pad 41 is transferred to the common electrode 270 of the upper substrate 200 directly through the external shorting point 4 without passing through a common voltage internal pad within the panels 10, 20, 30, and 40. Therefore, a separate common voltage wire for applying a common voltage to a common voltage internal pad within the panels 10, 20, 30, and 40 is not required in the dummy area D between the panels 10, 20, 30, and 40, thereby improving use efficiency of the mother panel 1.

The pixel voltage external pad 42 may be connected to the pixel voltage internal pads 420 of the panels 10, 20, 30, and 40 through the pixel voltage wire 520 that is formed in the dummy area D. Therefore, in a photo-curable process, a pixel voltage may be simultaneously applied to the panels 10, 20, 30, and 40.

The test voltage external pad 43 may be connected to the test voltage internal pad 430 of the panels 10, 20, 30, and 40 through the gate-on voltage wire 530 that is formed in the dummy area D. The test voltage internal pad 430 may be connected to a control terminal 51 of the test thin film transistor 50, and the pixel voltage internal pad 420 may be connected to the input terminal 52 of the test thin film transistor 50. Therefore, the pixel voltage through the pixel voltage internal pad 420, i.e., voltage for providing a pretilt to the liquid crystal molecules 310, may be applied simultaneously with the liquid crystal alignment gate-on voltage through the test voltage internal pads 430 to the panels 10, 20, 30 and 40, so the pixel voltage through the pixel voltage internal pad 420 may be transferred to a signal line, i.e., a data line or a gate line of the panels 10, 20, 30 and 40, through the input terminal 52 of the test thin film transistor 50. When driving a LCD, because the gate-on voltage is not applied to the test thin film transistor 50 that connects the gate-on voltage wire 530 and the gate line or the data line, the gate-on voltage wire 530 and the gate line or the data line may be separated without a separate laser trimming process that cuts the gate-on voltage wire 530 and the gate line or the data line.

The shorting bar 540 that is formed in the dummy area D electrically connects the pixel voltage wire 520 and the gate-on voltage wire 530. The shorting bar 540 may be formed, e.g., simultaneously, during formation of the signal lines of each layer of the panels 10, 20, 30, and 40. Because the pixel voltage wire 520 and the gate-on voltage wire 530 are electrically connected to the gate line or the data line within the panels 10, 20, 30, and 40, all wires on the mother panel 1 become equipotential by the shorting bar 540. Therefore, in a manufacturing process of the mother panel 1, electrostatic discharge (ESD) is prevented from being injected into the panels 10, 20, 30, and 40 from the outside.

Figure 3:
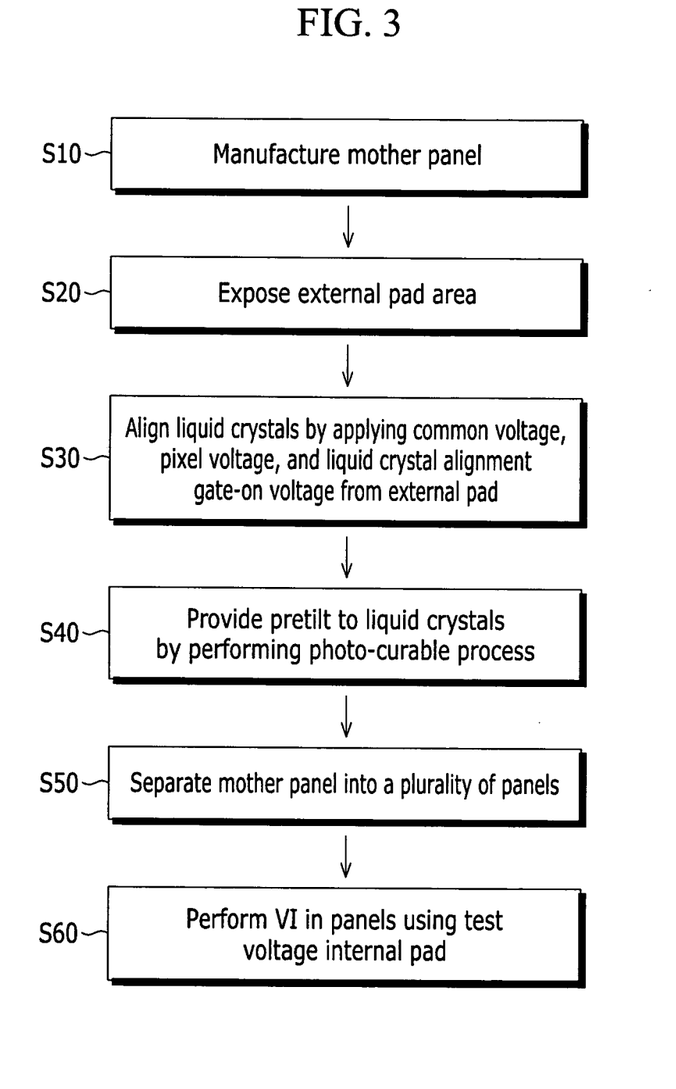
FIG. 3 illustrates a flowchart of a method of manufacturing a LCD using a mother panel of the LCD according to a first exemplary embodiment.

Hereinafter, a method of manufacturing a LCD using the mother panel 1 will be described in detail with reference to FIG. 3. FIG. 3 illustrates a flowchart of a method of manufacturing a LCD using the mother panel 1.

First, referring to FIGS. 1-3, the mother panel 1 may be manufactured by cohering the lower substrate 100 and the upper substrate 200 (operation S 10 in FIG. 3). In detail, the lower substrate 100 having a plurality of pixel electrodes 190 and a plurality of internal pads 420 and 430 may be formed. In this case, the common voltage external pad 41, the pixel voltage external pad 42, and the test voltage external pad 43 may be formed in the external pad area OP of the lower substrate 100. Further, the pixel voltage wire 520, the gate-on voltage wire 530, and the shorting bar 540 may be formed in the dummy area D of the panel area P of the lower substrate 100. The external shorting point 4 may be formed in a portion of the dummy area D that is adjacent to the external pad area OP of the panel area P of the lower substrate 100. Liquid crystal molecules 310 may be dripped within a sealing material 320 that is formed along the edge of the panels 10, 20, 30, and 40.

Next, the upper substrate 200 having the common electrode 270 may be formed. By cohering the lower substrate 100 and the upper substrate 200 using the sealing material 320, the mother panel 1 may be manufactured. In this case, the external shorting point 4 of the lower substrate 100 is connected to the common electrode 270 of the upper substrate 200.

Next, referring again to FIGS. 2 and 3, by removing some of the upper substrate 200 of the mother panel 1 via a scribing process, the external pads 41, 42, and 43 of the external pad area OP may be exposed (operation S20 in FIG. 3).

Next, common voltage is applied from the common voltage external pad 41 to the external shorting point 4, and a pixel voltage is applied from the pixel voltage external pad 42 to the pixel voltage internal pad 420. Simultaneously, the test thin film transistor 50 is turned-on by applying a liquid crystal alignment gate-on voltage from the test voltage external pad 43 to the test voltage internal pads 430 that are formed within the panels 10, 20, 30, and 40. Therefore, the pixel voltage applied through the input terminal 52 of the test thin film transistor 50 is transferred to the pixel electrode 190 of the panels 10, 20, 30, and 40 to align the liquid crystals 30 (operation S30 in FIG. 3). In this case, because the common voltage applied to the common voltage external pad 41 is transferred to the common electrode 270 of the upper substrate 200 directly through the external shorting point 4 without using an internal pad within the panels 10, 20, 30 and 40, formation of a separate common voltage wire between the panels 10, 20, 30, and 40 may be eliminated. In other words, a number of wires formed in the dummy area D of the mother panel 1 may be reduced, e.g., as compared to a conventional mother panel. Therefore, use efficiency of the mother panel 1 may be improved.

For example, the common voltage may be about 0 V, and the pixel voltage may be a higher voltage than the common voltage, e.g., about 5 V. The liquid crystal alignment gate-on voltage may be higher than the pixel voltage, e.g., about 10 V. Application of the voltages generates an electric field between the common electrode 270 and the pixel electrode 190 in the panels 10, 20, 30, and 40 of the mother panel 1, so the liquid crystal molecules 310 of the liquid crystal layer 300 of the panels 10, 20, 30, and 40 are aligned by the electric field. An alignment change of the liquid crystal molecules 310 according to the electric field is performed according to dielectric anisotropy of the liquid crystal molecules 310. That is, liquid crystal molecules 310 having positive dielectric anisotropy are inclined in a direction parallel to the electric field, and liquid crystal molecules 310 having negative dielectric anisotropy are inclined in a direction perpendicular to the electric field.

Next, a photo-curable process may be performed on the entire mother panel 1 (operation S40). The photo-curable process may be performed, e.g., with an ultraviolet (UV) exposure process, etc. Therefore, the liquid crystal molecules 310 of the liquid crystal layer 300 of the panels 10, 20, 30, and 40 sustain a pretilt even after the electric field is removed.

Next, the mother panel 1 may be separated into a plurality of panels 10, 20, 30, and 40 by performing a scribing process along a cutting line that is formed in the dummy area D (operation S50).

Next, a visual inspection (VI) is performed in the panels 10, 20, 30, and 40. That is, the test gate-on voltage is applied to the control terminal 51 of the test thin film transistor 50 of the panels 10, 20, 30, and 40. In this case, because the input terminal 52 of the test thin film transistor 50 is connected to the pixel voltage internal pad 420, the pixel voltage that is input through the pixel voltage internal pad 420 is transferred to a gate line or a data line that is connected to an output terminal 53 of the test thin film transistor 50 to perform the VI (operation S60).

In the first exemplary embodiment, by forming the external shorting point 4 that is connected to the common voltage external pad 41, a separate common voltage wire is not formed between the panels 10, 20, 30, and 40. Thus, use efficiency of the mother panel 1 is improved.

Figure 4:
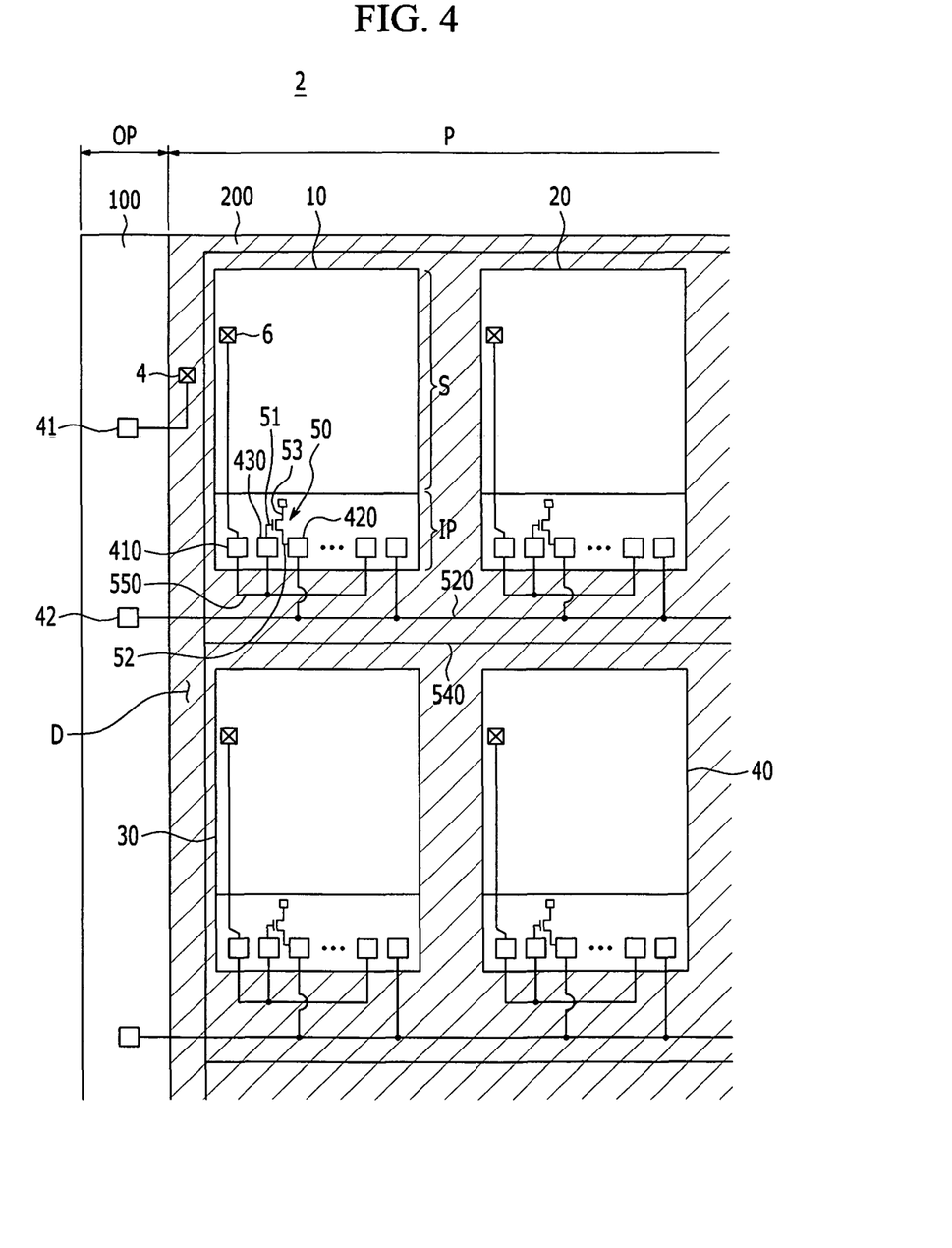
FIG. 4 illustrates a layout view of a mother panel of a LCD according to a second exemplary embodiment.

Hereinafter, a mother panel of a LCD and a method of manufacturing the LCD using the same according to a second exemplary embodiment will be described in detail with reference to FIG. 4. FIG. 4 illustrates a layout view of a mother panel of a LCD according to a second exemplary embodiment.

The second exemplary embodiment is substantially the same as the first exemplary embodiment described previously with reference to FIGS. 1-2, with the exception that the gate-on voltage wire 530 is eliminated to further reduce a number of wires in the dummy area D between adjacent panels on the mother panel. Instead, a common voltage internal pad 410 may directly connect an internal shorting point 6 to a test voltage internal pad 430. Mostly differences between the first and second exemplary embodiments will be described hereinafter.

In detail, as illustrated in FIG. 4, a mother panel 2 of a LCD according to the second exemplary embodiment may include the common voltage external pad 41 and the pixel voltage external pad 42 with a predetermined gap therebetween in the external pad area OP. The pretilt is provided to the liquid crystal molecules 310 of the liquid crystal layer 300 of the mother panel 2 by the common voltage that is applied through the common voltage external pad 41 and the pixel voltage that is applied through the pixel voltage external pad 42. As described previously with reference to FIGS. 1 and 2, the common voltage external pad 41 may be connected to the common electrode 270 via the shorting point 4, so a need for a wire connecting the common voltage external pad 41 to the internal pad area IP region of each panel via the dummy area D may be eliminated.

As illustrated in FIG. 4, the mother panel 2 may include a pixel voltage wire 520 and a shorting bar 540 in the dummy area D between the panels 10, 20, 30, and 40 for preventing ESD.

The panels 10, 20, 30, and 40 include the image area S and the internal pad area IP. The internal shorting point 6 may be connected to the common electrode 270 of the upper substrate 200, and may be formed at an edge of the image area S. The common voltage internal pad 410 that is connected to the internal shorting point 6, the pixel voltage internal pad 420 to which the pixel voltage is applied, and the test voltage internal pad 430 to which the liquid crystal alignment gate-on voltage is applied may be formed in the internal pad area IP.

The pixel voltage external pad 42 may be connected to the pixel voltage internal pad 420 of the panels 10, 20, 30, and 40 through the pixel voltage wire 520 that is formed in the dummy area D. Therefore, in a photo-curable process, the pixel voltage may be simultaneously applied to the panels 10, 20, 30, and 40.

The test voltage internal pad 430 of the panels 10, 20, 30, and 40 may be directly connected to the common voltage internal pad 410 through a test connection line 550. Therefore, common voltage that is applied from the common voltage external pad 41 to the external shorting point 4 may be transferred to the internal shorting point 6 via the common electrode 270 to be further transferred from the internal shorting point 6 to the common voltage internal pad 410. The common voltage is transferred from the common voltage internal pad 410 to the test voltage internal pad 430. The common voltage operates as a liquid crystal alignment gate-on voltage and the magnitude thereof is about 5 V, and a pixel voltage is a lower voltage than the common voltage and may be about 0 V.

As the common voltage is used to apply a liquid crystal alignment gate-on voltage to the test thin film transistor 50 of the panels 10, 20, 30, and 40, a separate test voltage external pad and a gate-on voltage wire for connecting a test voltage external pad and the test voltage internal pad 430 in the dummy area D between the panels 10, 20, 30, and 40 are not required. Therefore, use efficiency of the mother panel 2 may be improved.

That is, the test voltage internal pad 430 may be connected to the control terminal 51 of the test thin film transistor 50, and the pixel voltage internal pad 420 may be connected to the input terminal 52 of the test thin film transistor 50. Therefore, the liquid crystal alignment gate-on voltage of the same magnitude as that of the common voltage may be applied to the test voltage internal pad 430 by applying the common voltage to the common voltage external pad 41. Therefore, by simultaneously applying the test gate-on voltage to the test voltage internal pads 430 of the panels 10, 20, 30, and 40, a pixel voltage for providing a pretilt to the liquid crystal molecules 310 through the input terminal 52 of the test thin film transistor 50 may be transferred to a data line or a gate line of the panels 10, 20, 30, and 40. When separating the mother panel 2 into the plurality of panels 10, 20, 30, and 40 by performing a scribing process via separation of the test connection line 550, i.e., a line that directly connects the common voltage internal pad 410 and the test voltage internal pad 430 of the panels 10, 20, 30, and 40, when driving a LCD, the gate-on voltage is not applied to the test thin film transistor 50, and the common voltage is applied only through a separate driving circuit chip that is connected to the common voltage internal pad 410.

Figure 5:
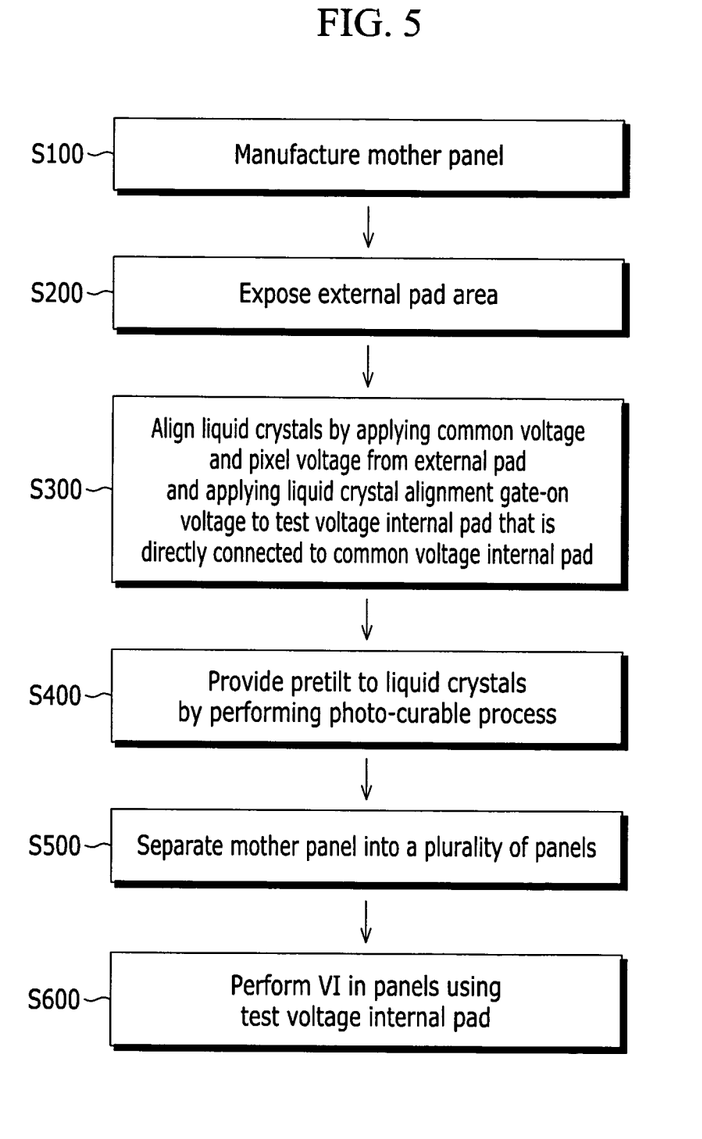
FIG. 5 illustrates a flowchart of a method of manufacturing a LCD using a mother panel of the LCD according to a second exemplary embodiment.

Hereinafter, a method of manufacturing a LCD using the mother panel 2 of a LCD according to a second exemplary embodiment will be described in detail with reference to FIG. 5. FIG. 5 illustrates a flowchart of a method of manufacturing a LCD using the mother panel 2.

First, as illustrated in FIG. 5, the mother panel 2 may be manufactured by cohering the lower substrate 100 and the upper substrate 200 (operation S100). The mother panel 2 may be manufactured by the following method. The lower substrate 100 having the plurality of pixel electrodes 190 and the plurality of internal pads 420 and 430 may be formed. In this case, the common voltage external pad 41 and the pixel voltage external pad 42 may be formed in the external pad area OP of the lower substrate 100, and the external shorting point 4 may be formed in the dummy area D of the panel area P that is adjacent to the external pad area OP of the lower substrate 100. Liquid crystal molecules 310 may be dripped into the sealing material 320 that is formed along the edge of the panels 10, 20, 30, and 40. The upper substrate 200 having the common electrode 270 may be formed. The mother panel 2 may be manufactured by cohering the lower substrate 100 and the upper substrate 200 using the sealing material 320. In this case, the external shorting point 4 of the lower substrate 100 may be connected to the common electrode 270 of the upper substrate 200.

Next, when removing some of the upper substrate 200 of the mother panel 2 via a scribing process, the external pads 41 and 42 of the external pad area OP may be exposed (operation S200).

Next, the common voltage may be applied from the common voltage external pad 41 to the external shorting point 4, the pixel voltage may be applied from the pixel voltage external pad 42 to the pixel voltage internal pad 420, and the common voltage may be applied as a liquid crystal alignment gate-on voltage to the test voltage internal pad 430 that is directly connected to the common voltage internal pad 410 through the test connection line 550 (operation S300). In this case, the common voltage that is applied from the common voltage external pad 41 is transferred to the common electrode 270 of the upper substrate 200 directly through the external shorting point 4 without passing through the common voltage internal pad 410 within the panels 10, 20, 30, and 40. Thus, a separate common voltage wire is not required in the dummy area D between the panels 10, 20, 30, and 40. Therefore, use efficiency of the mother panel 2 may be improved.

For example, the common voltage may be about 5 V, and the pixel voltage may be a lower voltage than the common voltage, e.g., about 0 V. The liquid crystal alignment gate-on voltage may be the common voltage. If the liquid crystal alignment gate-on voltage is equal to the pixel voltage, when the common voltage wire and the pixel voltage wire are short-circuited, a line failure may be visible. Thus, it is preferable to set the gate-on voltage as a higher voltage than the pixel voltage. For this reason, by directly connecting the test voltage internal pad 430 and the common voltage internal pad 410 using the test connection line 550, the liquid crystal alignment gate-on voltage becomes equal to the common voltage and higher than the pixel voltage.

Therefore, because an electric field is formed between the common electrode 270 and the pixel electrode 190 that are positioned at the panels 10, 20, 30, and 40 of the mother panel 2, the liquid crystal molecules 310 of the liquid crystal layer 300 of the panels 10, 20, 30, and 40 may be aligned by an electric field.

Next, a photo-curable process may be performed in the entire mother panel 2 (operation S400). The photo-curable process may be performed with an UV exposure process, etc. Therefore, the liquid crystal molecules 310 of the liquid crystal layer 300 of the panels 10, 20, 30, and 40 sustain a pretilt even after the electric field is removed.

Next, the mother panel 2 may be separated into the plurality of panels 10, 20, 30, and 40 by performing a scribing process along a cutting line (operation S500). The scribing process may include cutting the test connection line 550 that directly connects the common voltage internal pad 410 and the test voltage internal pad 430 of the panels 10, 20, 30, and 40. Therefore, when driving the LCD, the gate-on voltage is not applied to the test thin film transistor 50, and the common voltage is applied only through a separate driving circuit chip that is connected to the common voltage internal pad 410.

Next, a VI is performed in the panels 10, 20, 30, and 40 (operation S600). That is, a test gate-on voltage is applied to the control terminal 51 of the test thin film transistor 50 of the panels 10, 20, 30, and 40. In this case, because the input terminal 52 of the test thin film transistor 50 is connected to the pixel voltage internal pad 420, the pixel voltage that is input through the pixel voltage internal pad 420 is transferred to a gate line or a data line that is connected to the output terminal 53 of the test thin film transistor 50 to perform a VI.

In the second exemplary embodiment, the external shorting point 4 may be connected to the common voltage external pad 41. Further, the common voltage internal pad 410 may be directly connected between the internal shorting point 6 and the test voltage internal pad 430. As the common voltage is transferred between the external shorting point 4 and the internal shorting point 6, voltage application to the panels 10, 20, 30, and 40 may be performed without formation of a separate common voltage wire and gate-on voltage wire in the dummy area D between the panels 10, 20, 30, and 40. Thus, use efficiency of the mother panel 2 may be improved.

Figure 6:
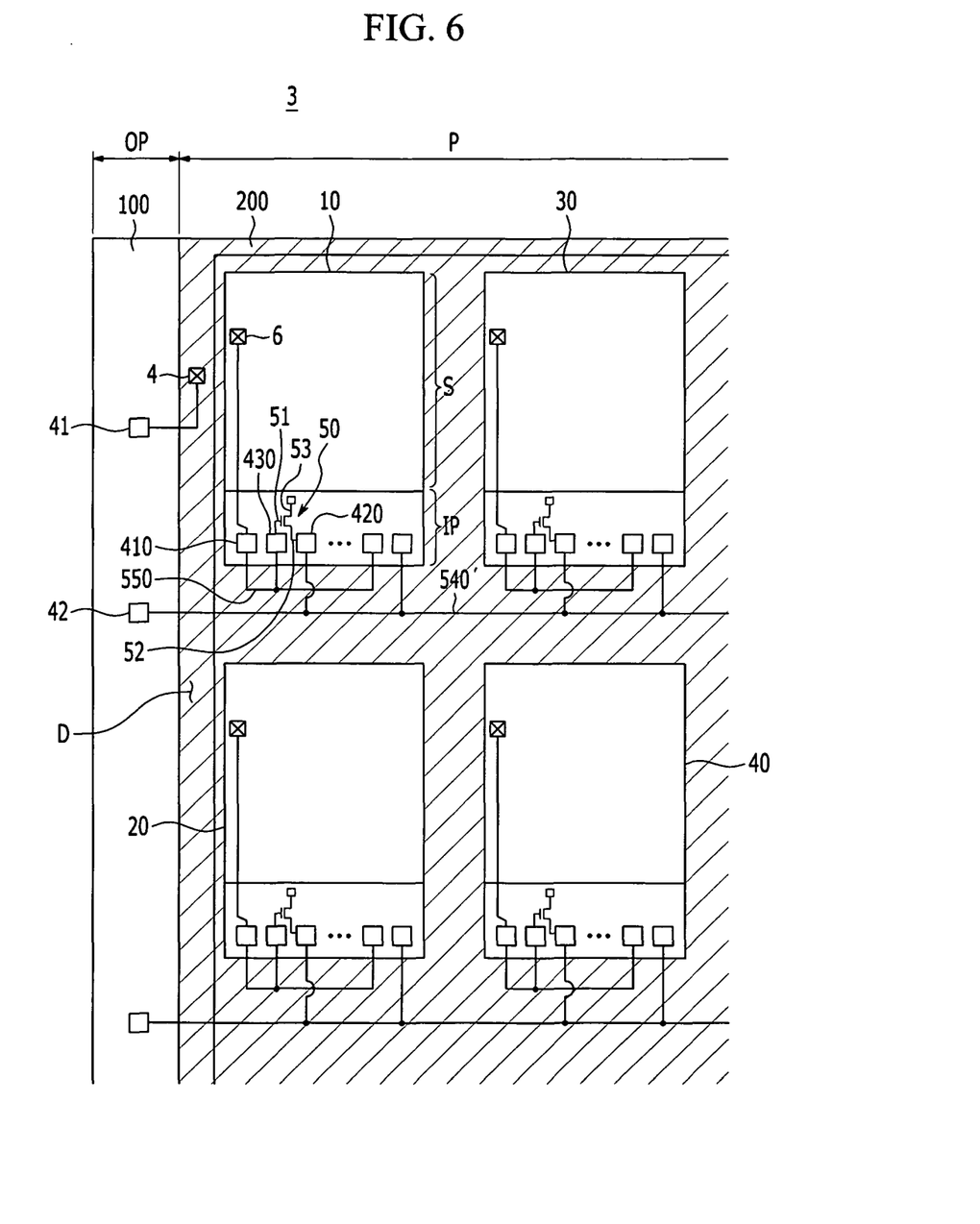
FIG. 6 illustrates a layout view of a mother panel of a LCD according to a third exemplary embodiment.

Hereinafter, a mother panel of a LCD according to a third exemplary embodiment will be described in detail with reference to FIG. 6. FIG. 6 illustrates a layout view of a mother panel of a LCD according to a third exemplary embodiment. The third exemplary embodiment is substantially the same as the second exemplary embodiment described previously with reference to FIG. 4, with the exception that a separate pixel voltage wire 520 is not formed in the dummy area D between the panels 10, 20, 30, and 40. That is, in the third exemplary embodiment, a shorting bar 540' may be used as a pixel voltage wire.

In detail, as illustrated in FIG. 6, a mother panel 3 according to the third exemplary embodiment may include the common voltage external pad 41 and the pixel voltage external pad 42 that are separated by a predetermined gap in the external pad area OP. A pretilt is provided to liquid crystal molecules 310 of the liquid crystal layer 300 of the mother panel 3 by the common voltage that is applied through the common voltage external pad 41 and the pixel voltage that is applied through the pixel voltage external pad 42.

The shorting bar 540' for preventing ESD may be formed in the dummy area D between the panels 10, 20, 30, and 40. Each of the panels 10, 20, 30, and 40 may include the image area S and he internal pad area IP, and the internal shorting point 6 that is connected to the common electrode 270 of the upper substrate 200 may be formed at the edge of the image area S. The common voltage internal pad 410 that is connected to the internal shorting point 6, the pixel voltage internal pad 420 to which the pixel voltage is applied, and the test voltage internal pad 430 to which the liquid crystal alignment gate-on voltage is applied may be formed in the internal pad area IP.

The test voltage internal pad 430 of the panels 10, 20, 30, and 40 may be directly connected to the common voltage internal pad 410 through the test connection line 550. The common voltage that is applied from the common voltage external pad 41 to the external shorting point 4 is transferred to the internal shorting point 6 via the common electrode 270 and is transferred from the internal shorting point 6 to the common voltage internal pad 410. The common voltage is transferred from the common voltage internal pad 410 to the test voltage internal pad 430. Therefore, in order to apply the liquid crystal alignment gate-on voltage to the test thin film transistor 50 of the panels 10, 20, 30, and 40, a separate gate-on voltage wire for connecting a test voltage external pad and the test voltage internal pad 430 is not formed in the dummy area D between the panels 10, 20, 30, and 40, thereby reducing the number of wires in the dummy area D and improving use efficiency of the mother panel 3.

The pixel voltage external pad 42 may be connected to the pixel voltage internal pad 420 of the panels 10, 20, 30, and 40 through the shorting bar 540' that is formed in the dummy area D. Because a large amount of ESD is apt to be generated by an alignment film forming process, the pixel voltage external pad 42 and the pixel voltage internal pad 420 of the panels 10, 20, 30, and 40 may be connected through the shorting bar 540' that is formed in a top layer of the shorting bars 540', or in order to prevent a voltage drop, the pixel voltage external pad 42 and the pixel voltage internal pad 420 of the panels 10, 20, 30, and 40 may be connected through a shorting bar 540' having low resistivity among the shorting bars 540'. As such, a separate pixel voltage wire for connecting the pixel voltage external pad 42 and the pixel voltage internal pad 420 is not required, thereby further reducing the number of wires in the dummy area D between the panels 10, 20, 30, and 40 and improving use efficiency of the mother panel 1.

Therefore, in a photo-curable process, the pixel voltage can be simultaneously applied to the panels 10, 20, 30, and 40. Thus, a separate pixel voltage wire for applying the pixel voltage to the pixel voltage internal pad 420 of the panels 10, 20, 30, and 40 may not be formed in the dummy area D between the panels 10, 20, 30, and 40, thereby further improving use efficiency of the mother panel 1.

According to example embodiments, a mother panel may include the external shorting point that may be connected between the common electrode and an external common voltage pad. As such, common voltage internal pads within the panels 10, 20, 30 and 40, and a corresponding separate wire through a dummy area may be eliminated, thereby improving use efficiency of the mother panel.

In contrast, a conventional mother panel, i.e., a mother panel without a shorting point, may include a minimum of three voltage wires between adjacent panels therein. That is, the conventional mother panel may include a separate common voltage wire in addition to a pixel voltage wire and a gate-on voltage wire. As such, a gap, i.e., a distance, between adjacent panels in the conventional mother panel may be relatively large in order to secure disposition space for the three separate voltage wires, thereby reducing use efficiency of the mother panel. Further, because the three separate voltage wires in the conventional mother panel should not overlap a panel cutting line of the mother panel, a cutting margin of the panel cutting line may be increased, thereby reducing use efficiency of the mother panel further.

DESCRIPTION OF SYMBOLS

| | |
|---|---|
| 1, 2, 3: mother panel | 4: external shorting point |
| 6: internal shorting point | 41: common voltage external pad |
| 42: pixel voltage external pad | 43: test voltage external pad |
| 50: test thin film transistor | 410: common voltage internal pad |
| 420: pixel voltage internal pad | 430: test voltage internal pad |

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A mother panel of a liquid crystal display (LCD) having a lower substrate with a pixel electrode, an upper substrate with a common electrode, and a liquid crystal layer between the lower and upper substrates, the mother panel comprising:
    an external pad area including a common voltage external pad and a pixel voltage external pad on the lower substrate, the common voltage external pad and pixel voltage external pad being configured to be applied with respective common and pixel voltages from the outside;
    a panel area including a plurality of panels and a dummy area between the panels; and
    an external shorting point in the dummy area of the panel area, the external shorting point being connected to the common electrode, and the common voltage external pad being directly connected to the external shorting point,
    wherein the external shorting point is electrically connected to multiple panels in the panel area of the mother panel via the common electrode of the upper substrate, the common voltage external pad being electrically connected to the multiple panels via the shorting point.

2. The mother panel as claimed in claim 1, wherein the pixel voltage external pad is connected to a pixel voltage internal pad in each panel in the panel area through a pixel voltage wire, the pixel voltage wire being positioned in the dummy area of the panel area.

3. The mother panel as claimed in claim 2, further comprising:
    a test thin film transistor in an internal pad area of each panel; and
    a test voltage internal pad connected to a control terminal of the test thin film transistor, an input terminal of the test thin film transistor being connected to a respective pixel voltage internal pad.

4. The mother panel as claimed in claim 3, further comprising:
    a test voltage external pad in the external pad area; and
    a gate-on voltage wire in the dummy area, the gate-on voltage wire connecting the test voltage external pad and the test voltage internal pad.

5. The mother panel as claimed in claim 3, further comprising:
an internal shorting point in each panel, the internal shorting point being connected to the common electrode; and
a common voltage internal pad connected to the internal shorting point, the common voltage internal pad being directly connected to the test voltage internal pad through a test connection line.

6. The mother panel as claimed in claim 1, further comprising a shorting bar in the dummy area of the panel area, the shorting bar being configured to prevent electrostatic discharge, and the pixel voltage external pad being connected to a pixel voltage internal pad of each panel through the shorting bar.

7. The mother panel as claimed in claim 6, further comprising:
a test thin film transistor in an internal pad area of each panel; and
a test voltage internal pad connected to a control terminal of the test thin film transistor, an input terminal of the test thin film transistor being connected to the pixel voltage internal pad.

8. The mother panel as claimed in claim 7, further comprising:
a test voltage external pad in the external pad area; and
a gate-on voltage wire in the dummy area, the gate-on voltage wire connecting the test voltage external pad and the test voltage internal pad.

9. The mother panel as claimed in claim 7, further comprising:
an internal shorting point in each panel, the internal shorting point being connected to the common electrode; and
a common voltage internal pad connected to the internal shorting point, the common voltage internal pad being directly connected to the test voltage internal pad through a test connection line.

10. The mother panel as claimed in claim 1, wherein:
the external shorting point is directly connected between the common electrode and the common voltage external pad, and
the external shorting point extends from the lower substrate to contact the common electrode on the upper substrate.

11. The mother panel as claimed in claim 10, further comprising an internal shorting point in each panel, the internal shorting point being connected between the common electrode and a common voltage internal pad in the panel, and the common voltage internal pad being directly connected to a test voltage internal pad in the panel.

12. A mother panel of a liquid crystal display (LCD) having a lower substrate with a pixel electrode, an upper substrate with a common electrode, and a liquid crystal layer between the lower and upper substrates, the mother panel comprising:
an external pad area including a common voltage external pad and a pixel voltage external pad on the lower substrate, the common voltage external pad and pixel voltage external pad being configured to be applied with respective common and pixel voltages from the outside;
a panel area including a plurality of panels and a dummy area between the panels; and
an external shorting point in the dummy area of the panel area, the external shorting point being connected to the common electrode, and the common voltage external pad being directly connected to the external shorting point, wherein:
the external pad area is external with respect to the dummy area of the panel area, the dummy area being between the external pad area and a respective panel, and
the external shorting point is in a portion of the dummy area between the external pad area and the respective panel.

13. The mother panel as claimed in claim 1, further comprising voltage wires in the dummy area of the panel area, the voltage wires connecting voltage external pads in the external pad area to corresponding voltage internal pads in the panel area, a total number of the voltage wires in the dummy area between adjacent panels being lower than a total number of the voltage external pads.

14. A method of manufacturing a mother panel of a liquid crystal display (LCD) having a lower substrate with a pixel electrode, an upper substrate with a common electrode, and a liquid crystal layer between the lower and upper substrates, the method comprising:
forming an external pad area including a common voltage external pad and a pixel voltage external pad on the lower substrate, the common voltage external pad and pixel voltage external pad being applied with respective common and pixel voltages from the outside;
forming a panel area including a plurality of panels and a dummy area between the panels; and
forming an external shorting point in the dummy area of the panel area, the external shorting point extending from the lower substrate to contact the common electrode on the upper substrate and to be connected to the common electrode, and the common voltage external pad being directly connected to the external shorting point.

15. The method as claimed in claim 14, further comprising:
aligning liquid crystal molecules of the liquid crystal layer, the alignment including:
applying the common voltage from the common voltage external pad to the external shorting point,
applying the pixel voltage from the pixel voltage external pad to a test voltage internal pad in each panel, and
applying a liquid crystal alignment gate-on voltage from a test voltage external pad in the external pad area to the test voltage internal pad in each panel; and
providing a pretilt to the liquid crystal molecules by performing a photo-curable process in the mother panel.

16. The method as claimed in claim 15, further comprising:
separating the mother panel into a plurality of panels by performing a scribing process; and
performing a visual inspection using the test voltage internal pad of the panels.

17. The method as claimed in claim 14, further comprising:
aligning liquid crystal molecules of the liquid crystal layer, the alignment including:
applying the common voltage from the common voltage external pad to the external shorting point,
applying the pixel voltage from the pixel voltage external pad to a test voltage internal pad in each panel, and
applying a liquid crystal alignment gate-on voltage to test thin film transistors of panels using a common voltage internal pad in each panel, the common voltage internal pad being directly connected to the test voltage internal pad in the panel; and
providing a pretilt to the liquid crystal molecules by performing a photo-curable process in the mother panel.

18. The method as claimed in claim 17, further comprising:
separating the mother panel into a plurality of panels by performing a scribing process; and
performing a visual inspection using the test voltage internal pad of the panels.

19. The method as claimed in claim 18, wherein performing the scribing process includes cutting a test connection line that directly connects the test voltage internal pad and the common voltage internal pad.

* * * * *